United States Patent
Shouhi et al.

(10) Patent No.: US 12,305,443 B2
(45) Date of Patent: May 20, 2025

(54) LIGHT CONTROL BODY AND LIGHT CONTROL WINDOWPANE

(71) Applicant: SEKISUI CHEMICAL CO., LTD., Osaka (JP)

(72) Inventors: Hajime Shouhi, Shiga (JP); Shougo Yoshida, Roermond (NL)

(73) Assignee: SEKISUI CHEMICAL CO., LTD., Osaka (JP)

( * ) Notice: Subject to any disclaimer, the term of this patent is extended or adjusted under 35 U.S.C. 154(b) by 1025 days.

(21) Appl. No.: 16/981,473

(22) PCT Filed: Mar. 25, 2019

(86) PCT No.: PCT/JP2019/012560
§ 371 (c)(1),
(2) Date: Sep. 16, 2020

(87) PCT Pub. No.: WO2019/189010
PCT Pub. Date: Oct. 3, 2019

(65) Prior Publication Data
US 2021/0025226 A1  Jan. 28, 2021

(30) Foreign Application Priority Data

Mar. 27, 2018 (JP) .............................. 2018-060540

(51) Int. Cl.
*E06B 9/24* (2006.01)
*B32B 17/10* (2006.01)

(52) U.S. Cl.
CPC .......... *E06B 9/24* (2013.01); *B32B 17/10036* (2013.01); *B32B 17/10504* (2013.01); *B32B 17/10678* (2013.01); *E06B 2009/2417* (2013.01); *E06B 2009/2464* (2013.01)

(58) Field of Classification Search
CPC ....... B21D 37/04; B25B 5/087; B30B 15/026; H04B 1/7073; H04B 1/709; H04B 1/7115; H04B 1/712; B32B 17/10036; B32B 17/10504; B32B 17/10678; B32B 7/023; E06B 2009/2417; E06B 2009/2464; E06B 9/24; G02B 26/02; G02B 5/22; G02B 5/23; G02B 1/04; G02B 5/208; G02F 1/133514; G02F 1/13; G02F 1/15

See application file for complete search history.

(56) References Cited

U.S. PATENT DOCUMENTS

| | | | |
|---|---|---|---|
| 10,928,667 B2 * | 2/2021 | Fujii | G02B 1/11 |
| 2005/0068629 A1 | 3/2005 | Fernando et al. | |
| 2005/0136260 A1 | 6/2005 | Garcia | |
| 2015/0331296 A1 | 11/2015 | Mennig et al. | |
| 2016/0011483 A1 * | 1/2016 | Bertolini | G02F 1/133305 359/275 |
| 2018/0281570 A1 | 10/2018 | Labrot et al. | |
| 2019/0121186 A1 | 4/2019 | Miura et al. | |

FOREIGN PATENT DOCUMENTS

| | | |
|---|---|---|
| CN | 107614302 | 1/2018 |
| CN | 207037271 | 2/2018 |
| CN | 108732803 | 11/2018 |
| EP | 2 958 150 | 12/2015 |
| JP | 2-22152 | 1/1990 |
| JP | 7-238747 | 9/1995 |
| JP | 9-29882 | 2/1997 |
| JP | 2000-8741 | 1/2000 |
| JP | 2001-206744 | 7/2001 |
| JP | 2004-93873 | 3/2004 |
| JP | 2008-217022 | 9/2008 |
| JP | 2012-068677 | 4/2012 |
| JP | 2015-529183 | 10/2015 |
| JP | 2017-106983 | 6/2017 |
| KR | 10-2011-0030410 | 3/2011 |
| KR | 10-2017-0064744 | 6/2017 |
| KR | 10-2018-0132782 | 12/2018 |
| WO | 2014/126065 | 8/2014 |
| WO | 2015/111562 | 7/2015 |

OTHER PUBLICATIONS

CN-112789525-A, Hisao I, May 2021 (Year: 2021).*
CN-208027034-U, He Z, Oct. 2018 (Year: 2018).*
CN-104919340-A, Sep. 2015, Schlott, Martin (Year: 2015).*
English translation of CN 107614302 B (Year: 2018).*
Extended European Search Report issued Oct. 22, 2021 in corresponding European Patent Application No. 19777012.6.
International Search Report issued May 28, 2019 in International (PCT) Application No. PCT/JP2019/012560, with English translation.

* cited by examiner

*Primary Examiner* — Collin X Beatty
(74) *Attorney, Agent, or Firm* — Wenderoth, Lind & Ponack, L.L.P.

(57) ABSTRACT

The present invention provides a light control body and a light control windowpane which are capable of preventing reduction in light control performance even when used in an environment exposed to strong light for a long period of time. Provided is a light control body including: a light control layer; and a visible light absorbing layer having a visible light transmittance Tv at a wavelength of 380 to 780 nm of 50% or lower.

10 Claims, No Drawings

LIGHT CONTROL BODY AND LIGHT CONTROL WINDOWPANE

TECHNICAL FIELD

The present invention relates to a light control body and a light control windowpane which are capable of preventing reduction in light control performance even when used in an environment exposed to strong light for a long period of time.

BACKGROUND ART

Patent Literature 1, for example, discloses a light control body including a laminate in which a liquid crystal material is arranged in at least one translucent substrate. According to Patent Literature 1, since a liquid crystal material has a light transmittance that changes according to the temperature, the use thereof enables control of the transmittance and reflectance of light at a specific wavelength in the sunlight as desired.

Also, various light control bodies have been proposed which can exhibit electrochromic or thermochromic properties in which the light transmittance can be arbitrarily and easily controlled with a stimulus such as a voltage or temperature in any wavelength region in a sufficiently wide wavelength region from the visible light region to the near infrared region.

CITATION LIST

Patent Literature

Patent Literature 1: JP H09-029882 A

SUMMARY OF INVENTION

Technical Problem

Light control bodies capable of controlling the transmittance of light in a specific wavelength region have been used in various fields such as indoor components, building components, or electronic components, for the purpose of adjusting the transmission of light by blocking the light at a specific wavelength or adjusting the color tone. In recent years, attention has been paid on a material that enables control of the light transmittance in the infrared region, and studies have been made thereon.

However, use of a light control body in an environment exposed to strong light, e.g., outdoors, for a long period of time disadvantageously reduces the light control performance or causes whitening of the light control body itself. Countermeasures for this, such as blocking of UV light, have been taken but sufficient effects have not been achieved so far.

The present invention aims to, in consideration of the current state of the art, provide a light control body and a light control windowpane which are capable of preventing reduction in the light control performance even when used in an environment exposed to strong light for a long period of time.

Solution to Problem

The present invention relates to a light control body including a light control layer and a visible light absorbing layer having a visible light transmittance Tv at a wavelength of 380 to 780 nm of 50% or lower.

The present invention is specifically described below.

The present inventors studied why the light control performance is reduced when a light control body is used in an environment exposed to strong light for a long period of time. They found out that not only UV light that has been considered as a cause of such reduction but also visible light deteriorates the light control body.

As a result of further intensive studies, they found out that combination of a light control layer with a visible light absorbing layer having a visible light transmittance Tv at a wavelength of 380 to 780 nm of 50% or lower can provide a light control body capable of preventing reduction in light control performance even when used in an environment exposed to strong light for a long period of time. Thus, the present invention was completed.

The light control body of the present invention has a light control layer and a visible light absorbing layer.

The light control layer is not limited and may be a layer containing any conventionally known light control material capable of controlling the light transmittance in any wavelength region with a stimulus such as voltage or temperature. Specific examples thereof include light control layers containing materials such as functional liquid crystal materials, electrochromic compounds (e.g., tungsten oxide, molybdenum oxide, and titanium oxide), and thermochromic compounds (e.g., functional dyes). In particular, since reduction in light control performance due to visible light is significant in a light control layer containing a functional liquid crystal material, the effect of the present invention is particularly exhibited in such a layer.

The light control layer containing a functional liquid crystal material may be a commercial light control film such as a light control film containing a polymer dispersed liquid crystal (e.g., "LC MAGIC" produced by Toppan Printing Co., Ltd.) and light control film including two plastic films and a liquid crystal interposed between the plastic films (e.g., "UMU film" produced by NSG UMU Products Co., Ltd.).

The light control layer may have any thickness. The lower limit thereof is preferably 50 μm and the upper limit thereof is preferably 700 μm. When the light control layer has a thickness within this range, the light control action by the light control layer is obvious and the light control body of the present invention can be used in various fields. The lower limit of the thickness of the light control layer is more preferably 70 μm, while the upper limit thereof is more preferably 500 μm. The lower limit is still more preferably 80 μm.

The visible light absorbing layer has a visible light transmittance Tv at a wavelength of 380 to 780 nm of 50% or lower. With such a visible light absorbing layer, reduction in light control performance of the light control layer due to visible light can be prevented. The visible light transmittance Tv is preferably 45% or lower, more preferably 35% or lower, still more preferably 30% or lower, particularly preferably 20% or lower, most preferably 16% or lower.

The visible light absorbing layer preferably has a maximum value of a UV light transmittance at a wavelength of 370 to 400 nm of 30% or lower. The phrase "maximum value of a UV light transmittance at a wavelength of 370 to 400 nm" more precisely refers to the highest transmittance among the measurement results of the transmittance measured at the wavelengths from 370 to 400 nm. With such a visible light absorbing layer, reduction in light control performance of the light control layer due to UV light can be prevented. The maximum value of the UV light transmittance is more preferably 15% or lower.

The visible light transmittance Tv and UV light transmittance can be determined in conformity with JIS R3106 (1998).

The visible light absorbing layer preferably does not have a polarization property. The absence of the polarization property allows the light control body of the present invention to exhibit its light control performance in any direction. Such a light control body can be used in various fields as an interior component, outdoor component, building component, or electronic component.

Examples of the visible light absorbing layer include a resin layer containing a thermoplastic resin and a colorant, and a colored glass sheet.

When the visible light absorbing layer is a resin layer containing a thermoplastic resin and a colorant, the light control body of the present invention can be used as an interlayer film for a laminated glass to provide a light control windowpane including a pair of glass sheets and the light control body interposed between the glass sheets.

When the visible light absorbing layer is a colored glass sheet, the light control body of the present invention can be used as a light control windowpane.

The present invention also encompasses such a light control windowpane.

When the visible light absorbing layer is a resin layer containing a thermoplastic resin and a colorant, the thermoplastic resin is not limited. Examples thereof include polyvinyl acetal resins, ethylene-vinyl acetate copolymer resins, ethylene-(meth)acrylic acid copolymer resins, ionomer resins, polyoxymethylene (or polyacetal) resins, acetoacetal resins, polyvinyl benzyl acetal resins, and polyvinyl cumin acetal resins. Examples further include polyvinylidene fluoride, polytetrafluoroethylene, vinylidene fluoride-propylene hexafluoride copolymers, and polytrifluoroethylene. Examples further include acrylonitrile-butadiene-styrene copolymers, polyesters, polyethers, polyamides, polycarbonates, polyacrylates, polymethacrylates, polyvinyl chloride, polyethylene, polypropylene, and polystyrene. Among these, preferred is at least one selected from the group consisting of a polyvinyl acetal resin, an ethylene-vinyl acetate copolymer resin, an ethylene-(meth)acrylic acid copolymer resin, and an ionomer resin. More preferred is a polyvinyl acetal resin.

The polyvinyl acetal resin is not limited as long as it is a polyvinyl acetal resin obtainable by acetalization of polyvinyl alcohol with an aldehyde. Preferred is a polyvinyl butyral resin. If needed, two or more polyvinyl acetal resins may be used in combination.

The lower limit of the degree of acetalization of the polyvinyl acetal resin is preferably 40 mol % and the upper limit thereof is preferably 85 mol %. The lower limit is more preferably 60 mol % and the upper limit is more preferably 75 mold.

The lower limit of the hydroxy group content of the polyvinyl acetal resin is preferably 15 mol % and the upper limit thereof is preferably 35 mol %. When the hydroxy group content is 15 mol % or more, the adhesiveness between the interlayer film for a laminated glass and glass is enhanced. When the hydroxy group content is 35 mol % or less, handleability of the interlayer film for a laminated glass is improved.

The degree of acetalization and hydroxy group content can be determined in conformity with "Testing methods for polyvinyl butyral" in JIS K6728.

The polyvinyl acetal resin can be prepared by acetalization of polyvinyl alcohol with an aldehyde.

The polyvinyl alcohol is normally obtained by saponification of polyvinyl acetate. Commonly, polyvinyl alcohol having a degree of saponification of 70 to 99.8 mol % is used. The degree of saponification of the polyvinyl alcohol is preferably 80 to 99.8 mol %.

The lower limit of the degree of polymerization of the polyvinyl alcohol is preferably 500 and the upper limit thereof is preferably 4,000. When the degree of polymerization of the polyvinyl alcohol is 500 or higher, the resulting laminated glass has higher penetration resistance. When the degree of polymerization of the polyvinyl alcohol is 4,000 or lower, an interlayer film for a laminated glass is easily formed. The lower limit of the degree of polymerization of the polyvinyl alcohol is more preferably 1,000 and the upper limit thereof is more preferably 3,600.

The aldehyde is not limited. Commonly, a C1-C10 aldehyde is suitably used.

The C1-C10 aldehyde is not limited, and examples thereof include n-butyraldehyde and isobutyraldehyde. The examples further include n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, polyvinyl benzylaldehyde, and polyvinyl cumin aldehyde. Preferred among these are n-butyraldehyde, n-hexylaldehyde, and n-valeraldehyde, and more preferred is n-butyraldehyde. Each of these aldehydes may be used alone or in combination of two or more.

The colorant is not limited as long as it can adjust the visible light transmittance Tv of the visible light absorbing layer to 50% or lower, and examples thereof include pigments, dyes, and colored toners.

The pigment is not limited, and examples thereof include carbon black, calcium carbonate, zinc oxide, white lead, lithopone, titanium dioxide, precipitated barium sulfate, barite powder, red lead, iron oxide red, chrome yellow, zinc yellow, ultramarine blue, and Prussian blue.

The dye is not limited, and examples thereof include azo dyes, anthraquinone dyes, and phthalocyanine dyes.

The colored toner is not limited, and examples thereof include green, black, blue, and red color toners. Each of these colorants may be used alone or in combination of two or more.

The amount of the colorant in the visible light absorbing layer may be appropriately determined in accordance with the type of the colorant and is not limited. Still, the lower limit of the amount relative to 100 parts by weight of the thermoplastic resin is preferably 0.0005 parts by weight and the upper limit thereof is preferably 0.05 parts by weight. When the amount of the colorant is within this range, the visible light transmittance Tv of the visible light absorbing layer can be easily adjusted to 50% or lower. The lower limit of the amount of the colorant is more preferably 0.0006 parts by weight and the upper limit thereof is more preferably 0.04 parts by weight.

When the visible light absorbing layer is a resin layer containing a thermoplastic resin and a colorant, the visible light absorbing layer preferably further contains a UV absorber. The UV absorber contained can prevent reduction in light control performance of the light control layer due to UV light.

The UV absorber is not limited, and examples thereof include compounds having a malonic acid ester structure, compounds having an oxanilide structure, compounds having a benzotriazole structure, compounds having a benzophenone structure, compounds having a triazine structure, compounds having a benzoate structure, compounds having a hindered amine structure. Each of these UV absorbers may be used alone, or in combination of two or more. In particular, preferred is a compound having a benzotriazole structure. The use of such a UV absorber enables easy adjustment of the maximum value of the UV light transmittance at a wavelength of 370 to 400 nm to 30% or lower, preventing reduction in light control performance of the light control layer due to UV light.

Examples of the compound having a benzotriazole structure include commercial products such as Tinuvin 970 (produced by BASF SE) and Eusorb UV-1990 (produced by Eutec Chemical Co., Ltd.).

The amount of the UV absorber in the visible light absorbing layer may be determined as appropriate in accordance with the type of the UV absorber and is not limited. Still, the lower limit of the amount of the UV absorber relative to 100 parts by weight of the thermoplastic resin is preferably 0.01 parts by weight and the upper limit thereof is preferably 2.0 parts by weight. When the amount of the UV absorber is within this range, the maximum value of the UV light transmittance of the visible light absorbing layer at a wavelength of 370 to 400 nm can be easily adjusted to 30% or lower. The lower limit of the amount of the UV absorber is more preferably 0.06 parts by weight and the upper limit thereof is more preferably 1.0 part by weight.

When the visible light absorbing layer is a resin layer containing a thermoplastic resin and a colorant, the visible light absorbing layer preferably further contains a plasticizer. The plasticizer is not limited, and examples thereof include organic ester plasticizers such as monobasic organic acid esters and polybasic organic acid esters, and phosphoric acid plasticizers such as organophosphate plasticizers and organophosphite plasticizers. The plasticizer is preferably a liquid plasticizer.

The monobasic organic acid ester is not limited, and examples thereof include glycol esters obtained by reaction between a glycol and a monobasic organic acid.

Examples of the glycol include triethylene glycol, tetraethylene glycol, and tripropylene glycol. Examples of the monobasic organic acid include butyric acid, isobutyric acid, caproic acid, 2-ethylbutyric acid, heptylic acid, n-octylic acid, 2-ethylhexylic acid, pelargonic acid (n-nonylic acid), and decylic acid.

Preferred among these are triethylene glycol dicaproate, triethylene glycol di-2-ethylbutyrate, triethylene glycol di-n-octylate, and triethylene glycol di-2-ethylhexylate.

The polybasic organic acid ester is not limited, and examples thereof include ester compounds of a polybasic organic acid (e.g., adipic acid, sebacic acid, azelaic acid) and a C4-C8 linear or branched alcohol. Preferred among these are dibutyl sebacate, dioctyl azelate, and dibutyl carbitol adipate.

The organic ester plasticizer is not limited, and examples thereof include triethylene glycol di-2-ethyl butyrate, triethylene glycol di-2-ethylhexanoate, triethylene glycol dicaprylate, triethylene glycol di-n-octanoate, and triethylene glycol di-n-heptanoate. Examples further include tetraethylene glycol di-n-heptanoate, tetraethylene glycol di-2-ethylhexanoate, dibutyl sebacate, dioctyl azelate, dibutyl carbitol adipate, ethylene glycol di-2-ethylbutyrate, and 1,3-propylene glycol di-2-ethylbutyrate. Examples further include 1,4-butyleneglycol di-2-ethylbutyrate, diethylene glycol di-2-ethylbutyrate, diethylene glycol di-2-ethylhexanoate, and dipropylene glycol di-2-ethylbutyrate. Examples further include triethylene glycol di-2-ethylpentanoate, tetraethylene glycol di-2-ethylbutyrate, and diethylene glycol dicapriate. Examples further include dihexyl adipate, dioctyl adipate, hexylcyclohexyl adipate, diisononyl adipate, heptylnonyl adipate, dibutyl sebacate, and oil-modified alkyd sebacate. Examples further include mixtures of a phosphoric acid ester and an adipic acid ester, mixed type adipic acid esters prepared from an adipic acid ester, a C4-C9 alkyl alcohol, and a C4-C9 cyclic alcohol, and C6-C8 adipic acid esters (e.g., hexyl adipate).

The organophosphate plasticizer is not limited, and examples thereof include tributoxyethyl phosphate, isodecylphenyl phosphate, and triisopropyl phosphate.

Further, the visible light absorbing layer preferably contains, as the plasticizer, any of triethylene glycol di-2-ethylhexanoate (3GO), triethylene glycol di-2-ethyl butyrate (3GH), tetraethylene glycol di-2-ethylhexanoate (4GO), and dihexyl adipate (DHA) for less hydrolysis. More preferred is any of tetraethylene glycol di-2-ethylhexanoate (4GO) and triethylene glycol di-2-ethylhexanoate (3GO). Still more preferred is triethylene glycol di-2-ethylhexanoate.

The plasticizer content of the visible light absorbing layer is not limited. Still, the lower limit of the amount relative to 100 parts by weight of the thermoplastic resin is preferably 30 parts by weight and the upper limit thereof is preferably 90 parts by weight. When the plasticizer content is 30 parts by weight or more, the melt viscosity of the visible light absorbing layer is lowered, increasing the deaeration properties upon production of a laminated glass with use of the light control body of the present invention as an interlayer film for a laminated glass. When the plasticizer content is 90 parts by weight or less, the resulting laminated glass has higher transparency. The lower limit of the plasticizer content is more preferably 35 parts by weight and the upper limit thereof is more preferably 70 parts by weight, still more preferably 63 parts by weight.

When the plasticizer content is 55 parts by weight or more, the visible light absorbing layer can have excellent sound insulation properties.

When the visible light absorbing layer is a resin layer containing a thermoplastic resin and a colorant, the visible light absorbing layer preferably further contains an adhesion modifier. The adhesion modifier contained adjusts the adhesive force of the visible light absorbing layer to glass, leading to production of a laminated glass having excellent penetration resistance.

The adhesion modifier is suitably, for example, at least one selected from the group consisting of alkali metal salts, alkaline earth metal salts, and magnesium salts. Examples of the adhesion modifier include salts of potassium, sodium, magnesium, and the like.

Examples of an acid constituting the salts include organic acids such as carboxylic acids (e.g., octylic acid, hexylic acid, 2-ethylbutyric acid, butyric acid, acetic acid, formic acid) and inorganic acids such as hydrochloric acid and nitric acid.

In the case where the laminated glass is desired to have heat insulation properties, the visible light absorbing layer may contain a heat ray absorber.

The heat ray absorber may be any heat ray absorber that can block infrared rays. Specifically, preferred is at least one selected from the group consisting of tin-doped indium oxide (ITO) particles, antimony-doped tin oxide (ATO) particles, aluminum-doped zinc oxide (AZO) particles, indium-doped zinc oxide (IZO) particles, tin-doped zinc oxide particles, silicon-doped zinc oxide particles, lanthanum hexaboride particles, and cerium hexaboride particles.

In the case where the visible light absorbing layer is a resin layer containing a thermoplastic resin and a colorant, the visible light absorbing layer may contain, if needed, conventionally known additives such as an antioxidant, a light stabilizer, a modified silicone oil as an adhesion modifier, a flame retardant, an antistatic agent, a moisture-proof agent, a heat ray reflecting agent, a heat ray absorber, and an anti-blocking agent.

In the case where the visible light absorbing layer is a colored glass sheet, the colored glass sheet is not limited as long as it has a light transmittance TV at a wavelength of 380 to 780 nm of 50% or lower, and may be a conventionally known colored glass sheet. Specific examples thereof include a glass sheet colored with the colorant. The colored glass sheet may contain the UV absorber.

The visible light absorbing layer may have any thickness. Still, the lower limit thereof is preferably 100 μm and the upper limit thereof is preferably 1,000 μm. When the thickness of the visible light absorbing layer is within this range, the visible light transmittance Tv is easily adjusted to 50% or lower. Moreover, when the light control body of the present invention is used as an interlayer film for a laminated glass, the basic quality of the resulting laminated glass, such as transparency or penetration resistance, is satisfactory. The lower limit of the thickness of the visible light absorbing layer is more preferably 200 μm and the upper limit thereof is more preferably 800 μm.

The visible light absorbing layer may be stacked on only one or both of the surfaces of the light control layer. From the standpoint of preventing reduction in light control performance, the visible light absorbing layer is preferably stacked on both of the surfaces.

In the case where the visible light absorbing layer is stacked on only one of the surfaces of the light control layer, a different layer having no visible light absorbing properties may be stacked on the surface opposite to the surface on which the visible light absorbing layer is stacked of the light control layer. Such a different layer can impart various properties to the light control body of the present invention.

The light control body of the present invention may be produced by any method. In an exemplary method, a stack including the visible light absorbing layer and the light control layer is heat-bonded.

The light control performance of the light control body of the present invention is less likely to be reduced even when the light control body is used in an environment exposed to strong light for a long period of time. The light control body of the present invention is therefore suitably used for outdoor applications, while the use of conventional light control bodies is mainly limited to indoor applications. Moreover, a light control body with better appearance can be obtained by selecting the color tone of the visible light absorbing layer. Such a light control body can be used for various applications such as windowpanes, display windows, partitions, and wall glass.

Advantageous Effects of Invention

The present invention can provide a light control body and a light control windowpane which are capable of preventing reduction in light control performance even when used in an environment exposed to strong light for a long period of time.

DESCRIPTION OF EMBODIMENTS

Embodiments of the present invention are more specifically described below with reference to, but not limited to, the following examples.

Example 1

(1) Preparation of Visible Light Absorbing Layer

To 40 parts by weight of triethylene glycol di-2-ethylhexanoate (3GO) were added 0.06 parts by weight of Tinuvin 970 (produced by BASF SE) and 0.2 parts by weight of Tinuvin 326 (produced by BASF SE) as UV absorbers. To the mixture were added 0.0005 parts by weight of copper phthalocyanine, 0.022 parts by weight of carbon black, and 0.0001 parts by weight of anthraquinone as colorants. To the mixture was further added magnesium acetate tetrahydrate as an adhesion modifier in such a manner that the concentration of the magnesium element in the visible light absorbing layer was set to 160 ppm, followed by mixing. Thus, a plasticizer solution was prepared. The entire amount of the obtained plasticizer solution and 100 parts by weight of a polyvinyl butyral resin (average degree of polymerization: 1,700, acetyl group content: 0.9 mol %, hydroxy group content: 30.6 mol %, degree of butyralization: 68.5 mol %) were sufficiently kneaded using a mixing roll to prepare a resin composition.

The obtained resin composition was extruded using an extruder to provide a visible light absorbing layer (PVB1) having a thickness of 380 μm. The obtained PVB1 was colored gray.

The obtained PVB1 was analyzed using a spectrophotometer (U-4100 produced by Hitachi High-Technologies Corporation) in conformity with JIS R 3106. The visible light transmittance Tv at a wavelength of 380 to 780 nm was 16% and the maximum value of the UV light transmittance at a wavelength of 370 to 400 nm was 15%.

(2) Production of Light Control Body

A PDLC film 1 ("LC MAGIC" produced by Toppan Printing Co., Ltd., 30 cm in length×30 cm in width, three-layer structure of ITO-sputtered PET/polymer dispersed liquid crystal/ITO-sputtered PET) having a thickness of 150 μm was provided as a light control layer.

A laminate in which the PVB1 and the light control layer were stacked in the order of PVB1/light control layer/PVB1 was heat-bonded under the conditions of 80° C. for 10 minutes. Thus, a light control body having a thickness of 910 μm was obtained.

(3) Production of Laminated Glass

The obtained light control body was interposed between a pair of clear glass sheets (visible light transmittance: 90.4%) having a size of 2.5 mm in thickness×30 cm in length×30 cm in width to prepare a laminate. The obtained laminate was pressed under vacuum at 90° C. for 30 minutes using a vacuum laminator to be press-bonded. The press-bonded laminate was subjected to 20-minute press-bonding under the conditions of 14 MPa at 140° C. using an autoclave, thereby obtaining a laminated glass.

Example 2

(1) Preparation of Visible Light Absorbing Layer

To 40 parts by weight of triethylene glycol di-2-ethylhexanoate (3GO) were added 0.01 parts by weight of Eusorb UV-1990 (produced by Eutech Chemical Co., Ltd.) and 0.2 parts by weight of Tinuvin 326 (produced by BASF SE) as UV absorbers. To the mixture were added 0.001 parts by weight of copper phthalocyanine and 0.022 parts by weight of carbon black as colorants. To the mixture were further added magnesium acetate tetrahydrate as an adhesion modifier in such a manner that the concentration of the magnesium element in the visible light absorbing layer was set to 160 ppm, followed by mixing. Thus, a plasticizer solution was prepared. The entire amount of the obtained plasticizer solution and 100 parts by weight of a polyvinyl butyral resin (average degree of polymerization: 1,700, acetyl group content: 0.9 mol %, hydroxy group content: 30.6 mol %, degree of butyralization: 68.5 mol %) were sufficiently kneaded using a mixing roll to prepare a resin composition.

The obtained resin composition was extruded using an extruder to provide a visible light absorbing layer (PVB2) having a thickness of 380 μm. The obtained PVB2 was colored blue.

The obtained PVB2 was analyzed using a spectrophotometer (U-4100 produced by Hitachi High-Technologies Corporation) in conformity with JIS R 3106. The visible light transmittance Tv at a wavelength of 380 to 780 nm was 6% and the maximum value of the UV light transmittance at a wavelength of 370 to 400 nm was 15%.

(2) Production of Light Control Body and Laminated Glass

A PDLC film 1 having a thickness of 150 μm was prepared as a light control layer.

A laminate in which the PVB2 and the light control layer were stacked in the order of PVB2/light control layer/PVB2 was heat-bonded under the conditions of 100° C. for 10 minutes. Thus, a light control body having a thickness of 910 μm was obtained.

A laminated glass was obtained as in Example 1, except that the obtained light control body was used.

Example 3

(1) Preparation of Visible Light Non-Absorbing Layer

To 40 parts by weight of triethylene glycol di-2-ethylhexanoate (3GO) was added 0.2 parts by weight of Tinuvin 326 (produced by BASF SE) as a UV absorber. To the mixture was further added magnesium acetate tetrahydrate as an adhesion modifier in such a manner that the concentration of the magnesium element in the visible light absorbing layer was set to 160 ppm, followed by mixing. Thus, a plasticizer solution was prepared. The entire amount of the obtained plasticizer solution and 100 parts by weight of a polyvinyl butyral resin (average degree of polymerization: 1,700, acetyl group content: 0.9 mol %, hydroxy group content: 30.6 mol %, degree of butyralization: 68.5 mol %) were sufficiently kneaded using a mixing roll to prepare a resin composition.

The obtained resin composition was extruded using an extruder to provide a visible light non-absorbing layer (PVB0) having a thickness of 380 μm. The obtained PVB0 was clear and transparent.

The obtained PVB0 was analyzed using a spectrophotometer (U-4100 produced by Hitachi High-Technologies Corporation) in conformity with JIS R 3106. The visible light transmittance Tv at a wavelength of 380 to 780 nm was 88.5% and the maximum value of the UV light transmittance at a wavelength of 370 to 400 nm was 40%.

(2) Production of Light Control Body and Laminated Glass

A PDLC film 1 having a thickness of 150 μm was provided as a light control layer.

A laminate in which the PVB1, the light control layer, and the PVB0 were stacked in the order of PVB1/light control layer/PVB0 was heat-bonded under the conditions of 100° C. for 10 minutes. Thus, a light control body having a thickness of 910 μm was obtained.

A laminated glass was obtained as in Example 1, except that the obtained light control body was used.

Example 4

A light control body and a laminated glass were obtained as in Example 1, except that the light control layer used was not the PDLC film 1 but a PDLC film 2 ("LC MAGIC reverse mode" produced by Toppan Printing Co., Ltd., 30 cm in length×30 cm in width, three-layer structure of ITO-sputtered PET/polymer dispersed liquid crystal/ITO-sputtered PET).

Example 5

(1) Preparation of Visible Light Absorbing Layer

To 100 parts by weight of an ethylene-vinyl acetate copolymer resin ("EVAFLEX EV170" produced by Du Pont-Mitsui Polychemicals, vinyl acetate content: 33% by mass) were added 0.06 parts by weight of Tinuvin 970 (produced by BASF SE) and 1.07 parts by weight of Tinuvin 326 (produced by BASF SE) as UV absorbers. To the mixture were further added 0.00065 parts by weight of copper phthalocyanine and 0.00013 parts by weight of anthraquinone as colorants. The mixture was sufficiently kneaded using a mixing roll to prepare a resin composition.

The obtained resin composition was extruded using an extruder to provide a visible light absorbing layer (EVA1) having a thickness of 380 μm. The obtained EVA1 was colored green.

The obtained EVA1 was analyzed using a spectrophotometer (U-4100 produced by Hitachi High-Technologies Corporation) in conformity with JIS R 3106. The visible light transmittance Tv at a wavelength of 380 to 780 nm was 28% and the maximum value of the UV light transmittance at a wavelength of 370 to 400 nm was 15%.

(2) Production of Light Control Body and Laminated Glass

A sputtered electrochromic film (obtained by sputtering 10 nm of ITO/100 nm of $NiO_2$/300 nm of $Ta_2O_5$/120 nm of $WO_3$/10 nm of ITO on a polyethylene terephthalate (PET) substrate) having a thickness of 50 μm was provided as a light control layer.

A laminate in which the EVA 1 and the light control layer were stacked in the order of EVA1/light control layer/EVA1 was heat-bonded under the conditions of 100° C. for 10 minutes. Thus, a light control body having a thickness of 810 μm was obtained.

A laminated glass was obtained as in Example 1, except that the obtained light control body was used.

Example 6

(1) Preparation of Visible Light Absorbing Layer

To 100 parts by weight of an ethylene-vinyl acetate copolymer resin ("EVAFLEX EV170" produced by Du Pont-Mitsui Polychemicals, vinyl acetate content: 33% by mass) were added 0.06 parts by weight of Tinuvin 970 (produced by BASF SE) and 1.07 parts by weight of Tinuvin 326 (produced by BASF SE) as UV absorbers. To the mixture were further added 0.0005 parts by weight of copper phthalocyanine and 0.0001 parts by weight of anthraquinone as colorants. The mixture was sufficiently kneaded using a mixing roll to prepare a resin composition.

The obtained resin composition was extruded using an extruder to provide a visible light absorbing layer (EVA2) having a thickness of 380 μm. The obtained EVA2 was colored green.

The obtained EVA was analyzed using a spectrophotometer (U-4100 produced by Hitachi High-Technologies Corporation) in conformity with JIS R 3106.

The visible light transmittance Tv at a wavelength of 380 to 780 nm was 35% and the maximum value of the UV light transmittance at a wavelength of 370 to 400 nm was 15%.

(2) Production of Light Control Body and Laminated Glass

A sputtered electrochromic film (obtained by sputtering of 10 nm of ITO/100 nm of NiO$_2$/300 nm of Ta$_2$O$_5$/120 nm of WO$_3$/10 nm of ITO on a polyethylene terephthalate (PET) substrate) having a thickness of 50 μm was provided as a light control layer.

A laminate in which the EVA2 and the light control layer were stacked in the order of EVA2/light control layer/EVA2 was heat-bonded under the conditions of 100° C. for 10 minutes. Thus, a light control body having a thickness of 810 μm was obtained.

A laminated glass was obtained as in Example 1, except that the obtained light control body was used.

Example 7

(1) Preparation of Visible Light Absorbing Layer

To 100 parts by weight of an ionomer resin ("Himilan 1707" produced by Du Pont-Mitsui Polychemicals) were added 0.06 parts by weight of Tinuvin 970 (produced by BASF SE) and 0.2 parts by weight of Tinuvin 326 (produced by BASF SE) as UV absorbers. To the mixture were further added 0.0005 parts by weight of copper phthalocyanine, 0.022 parts by weight of carbon black, and 0.0001 parts by weight of anthraquinone as colorants. The mixture was sufficiently kneaded using a mixing roll to prepare a resin composition.

The obtained resin composition was extruded using an extruder to provide a visible light absorbing layer (ionomer) having a thickness of 380 μm. The obtained ionomer was colored gray.

The obtained ionomer was analyzed using a spectrophotometer (U-4100 produced by Hitachi High-Technologies Corporation) in conformity with JIS R 3106. The visible light transmittance Tv at a wavelength of 380 to 780 nm was 16% and the maximum value of the UV light transmittance at a wavelength of 370 to 400 nm was 15%.

(2) Production of Light Control Body and Laminated Glass

A PDLC film 1 having a thickness of 150 μm was provided as a light control layer.

A laminate in which the ionomer and the light control layer were stacked in the order of ionomer/light control layer/ionomer was heat-bonded under the conditions of 100° C. for 10 minutes. Thus, a light control body having a thickness of 910 μm was obtained.

A laminated glass was obtained as in Example 1, except that the obtained light control body was used.

Example 8

(1) Preparation of Visible Light Absorbing Layer

To 40 parts by weight of triethylene glycol di-2-ethylhexanoate (3GO) was added 0.2 parts by weight of Tinuvin 326 (produced by BASF SE) as a UV absorber. To the mixture were added 0.0005 parts by weight of copper phthalocyanine, 0.022 parts by weight of carbon black, and 0.0001 parts by weight of anthraquinone as colorants. To the mixture was further added magnesium acetate tetrahydrate as an adhesion modifier in such a manner that the concentration of the magnesium element in the visible light absorbing layer was set to 160 ppm, followed by mixing. Thus, a plasticizer solution was prepared. The entire amount of the obtained plasticizer solution and 100 parts by weight of a polyvinyl butyral resin (average degree of polymerization: 1,700, acetyl group content: 0.9 mol %, hydroxy group content: 30.6 mol %, degree of butyralization: 68.5 mol %) were sufficiently kneaded using a mixing roll to prepare a resin composition.

The obtained resin composition was extruded using an extruder to provide a visible light absorbing layer (PVB3) having a thickness of 360 μm. The obtained PVB3 was colored gray.

The obtained PVB3 was analyzed using a spectrophotometer (U-4100 produced by Hitachi High-Technologies Corporation) in conformity with JIS R 3106.

The visible light transmittance Tv at a wavelength of 380 to 780 nm was 16% and the maximum value of the UV light transmittance at a wavelength of 370 to 400 nm was 15%.

(2) Production of Light Control Body and Laminated Glass

A PDLC film 1 ("LCMSGIC" produced by Toppan Printing Co., Ltd.) having a thickness of 150 μm was provided as a light control layer.

A laminate in which the PVB3 and the light control layer were stacked in the order of PVB3/light control layer/PVB3 was heat-bonded under the conditions of 100° C. for 10 minutes. Thus, a light control body having a thickness of 910 μm was obtained.

A laminated glass was obtained as in Example 1, except that the obtained light control body was used.

Example 9

(1) Preparation of Visible Light Absorbing Layer

To 40 parts by weight of triethylene glycol di-2-ethylhexanoate (3GO) were added 0.06 parts by weight of Tinuvin 970 (produced by BASF SE) and 0.2 parts by weight of Tinuvin 326 (produced by BASF SE) as UV absorbers. To the mixture were added 0.0002 parts by weight of copper phthalocyanine, 0.011 parts by weight of carbon black, and 0.0001 parts by weight of anthraquinone as colorants. To the mixture was further added magnesium acetate tetrahydrate as an adhesion modifier in such a manner that the concentration of the magnesium element in the visible light absorbing layer was set to 160 ppm, followed by mixing. Thus, a plasticizer solution was prepared. The entire amount of the obtained plasticizer solution and 100 parts by weight of a polyvinyl butyral resin (average degree of polymerization: 1,700, acetyl group content: 0.9 mol %, hydroxy group content: 30.6 mol %, degree of butyralization: 68.5 mol %) were sufficiently kneaded using a mixing roll to prepare a resin composition.

The obtained resin composition was extruded using an extruder to provide a visible light absorbing layer (PVB4) having a thickness of 380 μm. The obtained PVB4 was colored light gray.

The obtained PVB4 was analyzed using a spectrophotometer (U-4100 produced by Hitachi High-Technologies Corporation) in conformity with JIS R 3106. The visible light transmittance Tv at a wavelength of 380 to 780 nm was 45% and the maximum value of the UV light transmittance at a wavelength of 370 to 400 nm was 15%.

(2) Production of Light Control Body and Laminated Glass

A PDLC film 1 having a thickness of 150 μm was provided as a light control layer.

A laminate in which the PVB4 and the light control layer were stacked in the order of PVB4/light control layer/PVB4 was heat-bonded under the conditions of 100° C. for 10 minutes. Thus, a light control body having a thickness of 910 μm was obtained.

A laminated glass was obtained as in Example 1, except that the obtained light control body was used.

Comparative Example 1

A visible light non-absorbing layer (PVB0) having a thickness of 380 μm was obtained as in Example 3.

A PDLC film 1 having a thickness of 150 μm was provided as a light control layer.

A laminate in which the PVB0 and the light control layer were stacked in the order of PVB0/light control layer/PVB0 was heat-bonded under the conditions of 100° C. for 10 minutes. Thus, a light control body having a thickness of 910 μm was obtained.

A laminated glass was obtained as in Example 1, except that the obtained light control body was used.

Comparative Example 2

(1) Preparation of Visible Light Absorbing Layer

To 40 parts by weight of triethylene glycol di-2-ethylhexanoate (3GO) was added 0.2 parts by weight of Tinuvin 326 (produced by BASF SE) as a UV absorber. To the mixture were added 0.0002 parts by weight of copper phthalocyanine and 0.0001 parts by weight of anthraquinone as colorants. To the mixture was further added magnesium acetate tetrahydrate as an adhesion modifier in such a manner that the concentration of the magnesium element in the visible light absorbing layer was set to 160 ppm, followed by mixing. Thus, a plasticizer solution was prepared. The entire amount of the obtained plasticizer solution and 100 parts by weight of a polyvinyl butyral resin (average degree of polymerization: 1,700, acetyl group content: 0.9 mol %, hydroxy group content: 30.6 mol %, degree of butyralization: 68.5 mol %) were sufficiently kneaded using a mixing roll. Thus, a resin composition was obtained.

The obtained resin composition was extruded using an extruder to provide a visible light absorbing layer (PVB5) having a thickness of 380 μm. The obtained PVB5 was colored yellow.

The obtained PVB5 was analyzed using a spectrophotometer (U-4100 produced by Hitachi High-Technologies Corporation) in conformity with JIS R 3106. The visible light transmittance Tv at a wavelength of 380 to 780 nm was 83% and the maximum value of the UV light transmittance at a wavelength of 370 to 400 nm was 15%.

(2) Production of Light Control Body and Laminated Glass

A PDLC film 1 having a thickness of 150 μm was provided as a light control layer A laminate in which the PVB 5 and the light control layer were stacked in the order of PVB5/light control layer/PVB5 was heat-bonded under the conditions of 100° C. for 10 minutes. Thus, a light control body having a thickness of 910 μm was obtained.

A laminated glass was obtained as in Example 1, except that the obtained light control body was used.

Comparative Example 3

(1) Preparation of Visible Light Absorbing Layer

To 40 parts by weight of triethylene glycol di-2-ethylhexanoate (3GO) were added 0.06 parts by weight of Tinuvin 970 (produced by BASF SE) and 0.2 parts by weight of Tinuvin 326 (produced by BASF SE) as UV absorbers. To the mixture were added 0.00015 parts by weight of copper phthalocyanine, 0.0095 parts by weight of carbon black, and 0.0001 parts by weight of anthraquinone as colorants. To the mixture was further added magnesium acetate tetrahydrate as an adhesion modifier in such a manner that the concentration of the magnesium element in the visible light absorbing layer was set to 160 ppm, followed by mixing. Thus, a plasticizer solution was prepared. The entire amount of the obtained plasticizer solution and 100 parts by weight of a polyvinyl butyral resin (average degree of polymerization: 1,700, acetyl group content: 0.9 mol %, hydroxy group content: 30.6 mol %, degree of butyralization: 68.5 mol %) were sufficiently kneaded using a mixing roll to prepare a resin composition.

The obtained resin composition was extruded using an extruder to provide a visible light absorbing layer (PVB5) having a thickness of 380 μm. The obtained PVB6 was colored light gray.

The obtained PVB6 was analyzed using a spectrophotometer (U-4100 produced by Hitachi High-Technologies Corporation) in conformity with JIS R 3106. The visible light transmittance Tv at a wavelength of 380 to 780 nm was 55% and the maximum value of the UV light transmittance at a wavelength of 370 to 400 nm was 15%.

(2) Production of Light Control Body and Laminated Glass

A PDLC film 1 having a thickness of 150 μm was provided as a light control layer.

A laminate in which the PVB6 and the light control layer were stacked in the order of PVB6/light control layer/PVB6 was heat-bonded under the conditions of 100° C. for 10 minutes. Thus, a light control body having a thickness of 910 μm was obtained.

A laminated glass was obtained as in Example 1, except that the obtained light control body was used.

Evaluation

The laminated glasses obtained in the examples and comparative examples were evaluated by the following methods.

Tables 1 to 3 show the results.

(1) Evaluation on Change in Appearance and Color Tone Before and after Light Resistance Test The obtained laminated glass was irradiated with xenon light for 500 hours under the conditions of a black panel temperature of 83° C., an in-chamber temperature of 50° C., and a humidity of 50% RH. The irradiance of xenon light was set to be 180 W/m$^2$ when measured at a wavelength of 300 to 400 nm. Quartz was used as an inner filter and quartz (#275) was used as an outer filter. The xenon tester used was "SX-75" produced by Suga Test Instruments Co., Ltd. The laminated glass of Example 3 was irradiated from the PVB1 side.

The change in appearance before and after the light resistance test was visually evaluated. The change in color tone was evaluated in terms of the color difference ΔE using a spectrophotometer (U-4100 produced by Hitachi High-Technologies Corporation).

(2) Evaluation 1 on Light Control Performance Before and after Light Resistance Test A voltage (−2 V) was applied to the light control body in the obtained laminated glass, and the appearance of the laminated glass with and without voltage application was visually observed.

Next, the obtained laminated glass was irradiated with xenon light under the same conditions as those for the evaluation on change in appearance and color tone.

To the light control body in the laminated glass after the light resistance test was applied a voltage (−2 V), and whether the laminated glass can perform similar light control to that before the light resistance test was visually observed. The case where similar light control was performed was evaluated as "∘ (Good)" and the case where similar light control was not performed was evaluated as "x (Poor)".

TABLE 1

| | | | Example 1 | Example 2 | Example 3 | Example 4 | Example 5 | Example 6 |
|---|---|---|---|---|---|---|---|---|
| Structure of light control body | Visible light absorbing layer/visible light non-absorbing layer | Type | PVB1 | PVB2 | PVB1 | PVB1 | EVA1 | RVA2 |
| | | Color | Gray | Blue | Gray | Gray | Green | Green |
| | | Visible light transmittance Tv (%) | 16 | 6 | 16 | 16 | 28 | 35 |
| | | Maximum value of UV light transmittance (%) | 15 | 15 | 15 | 15 | 15 | 15 |
| | Light control layer | | PDLC1 | PDLC1 | PDLC1 | PDLC2 | Sputtered electrochromic film | Sputtered electrochromic film |
| | Visible light absorbing layer/visible light non-absorbing layer | Type | PVB1 | PVB2 | PVB0 | PVB1 | EVA1 | EVA2 |
| | | Color | Gray | Blue | Clear & colorless | Gray | Green | Green |
| | | Visible light transmittance Tv (%) | 16 | 6 | 88.5 | 16 | 28 | 35 |
| | | Maximum value of UV light transmittance (%) | 15 | 15 | 40 | 15 | 15 | 15 |
| Evaluation | Change in appearance and color tone before/after light resistance test | Change in appearance | None | None | None | None | None | None |
| | | Change in color tone (ΔE) | 1.5 | 1.5 | 1.5 | 1.5 | 1.5 | 2.0 |
| | Light control performance | Not under application of voltage | Gray & opaque | Blue & vopaque | Gray & opaque | Gray & transparent | Green & opaque | Green & opaque |
| | | Under application of voltage | Gray & transparent | Blue & transparent | Gray & transparent | Gray & opaque | Green & transparent | Green & transparent |
| | | Light control performance after light resistance test | ○ | ○ | ○ | ○ | ○ | ○ |

TABLE 2

| | | | Example 7 | Example 8 | Example 9 | Comparative Example 1 | Comparative Example 2 | Comparative Example 3 |
|---|---|---|---|---|---|---|---|---|
| Structure of light control body | Visible light absorbing layer/visible light non-absorbing layer | Type | Ionomer | PVB3 | PVB4 | PVB0 | PVB5 | PVB6 |
| | | Color | Gray | Gray | Light gray | Clear & colorless | Yellow | Light gray |
| | | Visible light transmittance Tv (%) | 16 | 16 | 45 | 88.5 | 83 | 55 |
| | | Maximum value of UV light transmittance (%) | 15 | 15 | 15 | 40 | 15 | 15 |
| | Light control layer | | PDLC1 | PDLC1 | PDLC1 | PDLC1 | PDLC1 | PDLC1 |
| | Visible light absorbing layer/visible light non-absorbing layer | Type | Ionomer | PVB3 | PVB4 | PVB0 | PVB5 | PVB6 |
| | | Color | Gray | Gray | Light gray | Clear & colorless | Yellow | Light gray |
| | | Visible light transmittance Tv (%) | 16 | 16 | 45 | 88.5 | 83 | 55 |
| | | Maximum value of UV light transmittance (%) | 15 | 15 | 15 | 40 | 15 | 15 |
| Evaluation | Change in appearance and color tone before/after light resistance test | Change in appearance | None | None | None | Whitened | Whitened | None |
| | | Change in color tone (ΔE) | 1.5 | 2.0 | 1.5 | 6.3 | 1.5 | 1.5 |
| | Light control performance | Not under application of voltage | Gray & opaque | Gray & opaque | Gray & opaque | Gray & opaque | Yellow & opaque | Gray & opaque |
| | | Under application of voltage | Gray & transparent | Gray & transparent | Gray & transparent | Gray & transparent | Yellow & transparent | Gray & transparent |
| | | Light control performance after light resistance test | ○ | ○ | ○ | X | X | X |

(3) Evaluation 2 on Change in Appearance and Color Tone Before and After Light Resistance Test The laminated glasses obtained in Example 1 and Comparative Example 1 were irradiated with xenon light under the conditions of a black panel temperature of 80° C., an in-chamber temperature of 45° C., and a humidity of 50% RH for 100 hours, 250 hours, and 1,000 hours. The irradiance of xenon light was set to be 120 W/m² when measured at a wavelength of 300 to 400 nm. Quartz was used as an inner filter and quartz (#275) was used as an outer filter. The xenon tester used was "SX-75" produced by Suga Test Instruments Co., Ltd.

For determining the change in appearance before and after the light resistance test, the yellow index (YI), and the values L*, a*, and b* in the CIE 1976 (L*a*b*) color space were measured using a spectrophotometer ("U-4100" produced by Hitachi High-Technologies Corporation), and the change was determined in terms of ΔL*, Δa*, Δb*, ΔYI, and the color difference ΔE. The measurement was performed at 0° C. in conformity with JIS R 3106 and JIS Z 8722.

The test was carried out with and without voltage application (−2 V) to the light control body in the laminated glass.

TABLE 3

| | | | 100 hr | 250 hr | 1000 hr |
|---|---|---|---|---|---|
| Example 1 | With voltage application | ΔL* | 0.16 | 0.18 | 0.20 |
| | | Δa* | −0.13 | −0.15 | −0.17 |
| | | Δb* | −0.02 | −0.04 | −0.06 |
| | | ΔYI | −0.04 | −0.06 | −0.08 |
| | | ΔE | 0.21 | 0.24 | 0.27 |
| | Without voltage application | ΔL* | −0.16 | −0.14 | −0.12 |
| | | Δa* | −0.01 | −0.08 | −0.10 |
| | | Δb* | −0.01 | −0.13 | −0.17 |
| | | ΔYI | −0.13 | −0.33 | −0.53 |
| | | ΔE | 0.16 | 0.21 | 0.23 |
| Comparative Example 1 | With voltage application | ΔL* | 0.16 | 1.24 | Unmeasurable |
| | | Δa* | −0.22 | −1.02 | Unmeasurable |
| | | Δb* | 0.02 | −1.88 | Unmeasurable |
| | | ΔYI | −0.20 | −1.43 | Unmeasurable |
| | | ΔE | 0.27 | 2.47 | Unmeasurable |
| | Without voltage application | ΔL* | 0.18 | 0.73 | −1.02 |
| | | Δa* | −0.01 | −0.63 | −1.68 |
| | | Δb* | 0.02 | −2.28 | −5.28 |
| | | ΔYI | −0.24 | −1.64 | −6.64 |
| | | ΔE | 0.18 | 2.48 | 5.63 |

INDUSTRIAL APPLICABILITY

The present invention can provide a light control body and a light control windowpane which are capable of preventing reduction in light control performance even when used in an environment exposed to strong light for a long period of time.

The invention claimed is:

1. A light control body comprising:
   a light control layer; and
   a visible light absorbing layer having a visible light transmittance Tv at a wavelength of 380 to 780 nm of less than 50%,
   wherein the visible light absorbing layer is stacked on only one or both of the surfaces of the light control layer,
   wherein the visible light absorbing layer is a resin layer containing a thermoplastic resin, a colorant, and a plasticizer, and
   wherein the light control layer has a thickness of 50 μm or more.

2. The light control body according to claim 1, wherein the light control layer contains a functional liquid crystal material.

3. The light control body according to claim 1, wherein the visible light absorbing layer has a visible light transmittance Tv at a wavelength of 380 to 780 nm of 30% or lower.

4. The light control body according to claim 1, wherein the visible light absorbing layer has a maximum value of a UV light transmittance at a wavelength of 370 to 400 nm of 30% or lower.

5. The light control body according to claim 1, wherein the visible light absorbing layer does not have a polarization property.

6. The light control body according to claim 1, wherein the thermoplastic resin is at least one selected from the group consisting of a polyvinyl acetal resin, an ethylene-vinyl acetate copolymer resin, an ethylene-(meth)acrylic acid copolymer resin, and an ionomer resin.

7. The light control body according to claim 1, wherein the visible light absorbing layer contains a UV absorber.

8. The light control body according to claim 7, wherein the UV absorber is a compound having a benzotriazole structure.

9. A light control windowpane comprising
   a laminated glass comprising:
   a pair of glass sheets; and
   the light control body according to claim 1 interposed between the pair of glass sheets.

10. The light control body according to claim 1, wherein the thickness of the light control layer is a range of 50 μm or more and 500 μm or less.

* * * * *